(12) United States Patent
Daigle, Sr. et al.

(10) Patent No.: US 8,650,733 B2
(45) Date of Patent: Feb. 18, 2014

(54) AUTO GLASS INSTALLER

(75) Inventors: Douglas Joseph Daigle, Sr., Gibson, LA (US); Randy Paul Daigle, Apopka, FL (US)

(73) Assignee: Douglas J. Daigle, Sr., Gibson, LA (US)

( * ) Notice: Subject to any disclaimer, the term of this patent is extended or adjusted under 35 U.S.C. 154(b) by 260 days.

(21) Appl. No.: 12/455,832

(22) Filed: Jun. 8, 2009

(65) Prior Publication Data

US 2010/0011554 A1 Jan. 21, 2010

Related U.S. Application Data

(60) Provisional application No. 61/132,240, filed on Jun. 16, 2008.

(51) Int. Cl.
*B23Q 1/00* (2006.01)
*B23Q 3/00* (2006.01)
*B23Q 7/04* (2006.01)
*B23Q 17/00* (2006.01)

(52) U.S. Cl.
USPC .............................. 29/283; 29/468; 29/407.01

(58) Field of Classification Search
USPC ................ 29/283, 468, 407.01, 281.5
See application file for complete search history.

(56) References Cited

U.S. PATENT DOCUMENTS

| | | | | |
|---|---|---|---|---|
| 4,998,711 | A | * | 3/1991 | Borg .............................. 269/21 |
| 5,525,027 | A | * | 6/1996 | Jinno et al. .................... 414/680 |
| 5,772,823 | A | * | 6/1998 | Rusch et al. ................... 156/108 |
| 7,039,995 | B2 | * | 5/2006 | Thompson .................... 29/281.5 |
| 7,216,411 | B1 | * | 5/2007 | Mayhugh ......................... 29/468 |
| 7,818,863 | B2 | * | 10/2010 | Maekawa et al. .......... 29/407.01 |
| 2006/0156533 | A1 | * | 7/2006 | Mayhugh ......................... 29/468 |

* cited by examiner

*Primary Examiner* — Alvin Grant
(74) *Attorney, Agent, or Firm* — Douglas J. Daigle, Sr.; Randy Paul Daigle

(57) ABSTRACT

A portable windshield installation device capable of removing and installing windshields and/or back glasses by remote control actuators; with the device carrying all the weight and very little manually help from the installer.

7 Claims, 4 Drawing Sheets

AUTO GLASS INSTALLER

FIELD OF THE INVENTION

This invention relates to a vehicle windshield installation device operated by a plurality of 12 volt remote control actuators which allows this device to perform a complete installation with very little physical exertion from the installer.

BACKGROUND OF THE INVENTION

Replacement windshields and back glasses must be properly set in the sealant to prevent water and air leaks. The manual lifting and awkward support that is needed to enable a worker to hold a windshield by its end and properly align it with the seal requires considerable manual dexterity, effort, and strength. The worker typically stands on the ground beside the vehicle for which the windshield is being replaced and hold the windshield horizontally, with the worker's arms typically outstretched. This is almost always a very awkward, unsatisfactory lifting position. For this reason it is well known that windshield replacement workers encounter frequent back injuries resulting from handling heavy windshields in this awkward lifting position.

Consequently, the medical expenses associated with automotive windshield replacements by on-site workers are considerably high. It is becoming almost mandatory that, for on-site windshield replacements, two workers be deployed to each set one side of the windshield. Obviously, the requirement for a second worker for mobile on-site windshield replacements adds significantly to the overhead costs for the windshield replacement business in question. It is desirable, therefore, to provide an effective windshield replacement system that will enable a single worker to perform on-site automotive windshield replacement without requiring the worker to exert significant effort manually lifting, handling, and placing windshields.

It is also desirable to minimize the possibility of injury to on-site windshield replacement workers and to eliminate the additional labor that results when a two-worker windshield installation crew is employed for this purpose. Finally, it is desirable to provide an automotive windshield replacement system that enables a single worker to easily and accurately achieve removal and installation of a replacement windshield without exerting significant manual effort during the entire operation.

Therefore all existing prior art heretofore known suffers from a number of disadvantages as described in the following prior art:

U.S. Pat. No. 5,772,823 to Rusch dated Jun. 30, 1998 The total weight of the windshield is carried by the installer which could cause back injuries and is very difficult to align the windshield properly into the sealant. This method of installation would not be advisable on large vehicles because the installer would have to work on a ladder to manually set the windshield.

U.S. Pat. No. 7,322,092B2 to Beloit and Coyle dated Jan. 29, 2008 The weight of the windshield is partially supported with the installer carrying most of the weight and has to be manually set in place by the installer. This device is very difficult to handle on large vehicles because the installer would have to be on a ladder to manually set the windshield; which would be very unsafe for the installer. Also, with all of the weight of the device supported by the side window of the vehicle, it could cause damage to the side window and regulator.

U.S. Pat. No. 5,429,253 to McNett dated Jul. 4, 1995 The hoist will carry the weight of the windshield but forces the installer to manually set the windshield. On large vehicles, the installer must work on a ladder; which presents safety concerns.

U.S. Pat. No. 7,039,995B2 to Thompson dated May 9, 2006 This apparatus will support the weight of the windshield. However, jacks, locks and motions are controlled by hand, and not enough motions are available to handle some windshields and back glasses. On large vehicles, the installer must be on a ladder to manually set windshields; thus causing a safety hazard.

SUMMARY

The principal feature of the present invention is to provide an original windshield installation device that can install a windshield or back glass on a vehicle with very little assistance from the installer.

Being operated almost entirely by remote control, this device allows a single technician to have full control of the windshield installation, even on large trucks, without being forced to stand on a ladder to manually set the glass.

The present invention is a portable device which can be assembled at the job site in approximately two minutes. The device is capable of removing and installing automobile and truck windshields or back glasses with only one person. As an entirely mechanical device, it will carry the weight of the windshield and install it by remote control and minimal physical exertion.

Specifically, the device consists of tubular metal members welded together; including bushings and hinges for the working of the movable parts. After manually cutting the old glass away from the automobile, a vertical telescoping post 13 is placed in front of the front-left tire for a windshield replacement or behind the rear-right tire for a back glass replacement. The vehicle then moves onto plate 10 at the base of post 13 which stabilizes the device.

Twelve volt power is provided via a retractable cord from the installer's vehicle and plugged into receiver 17A. Horizontal swing arm 21 is then slid into vertical post receiver 19, where twelve volt contact 20 electrifies all motions on horizontal swing arm 21. Next, suction cup arm 29 is slid into horizontal swing arm receiver 31.

After manually swinging horizontal swing arm 21 close to the old glass, tilt it downward and move suction cups 30 & 30A onto the glass with remote control 33 and secure suction cups 30 & 30A to the glass. Still using remote control 33, tilt the glass upward with suction cup arm 29 and manually swing horizontal swing arm 21 away from the vehicle. Lower horizontal swing arm 21 and tilt appropriately via remote control 33 for easy access to the old glass and remove the old glass, still attached to suction cup arm 29, from horizontal swing arm receiver 31.

After removing the old glass from suction cup arm 29, attach the new glass to suction cups 30 & 30A and slide suction cup arm 29 back into receptor 31 located on horizontal swing arm 21. After adjusting the height of horizontal swing arm 21, manually swing said arm toward the windshield opening. With adjustments made by remote control 33 to suction cup arm 29, tilt the glass down and slide the glass in place for a perfect installation every time.

DETAILED DESCRIPTION OF THE DRAWINGS

Figure 1:
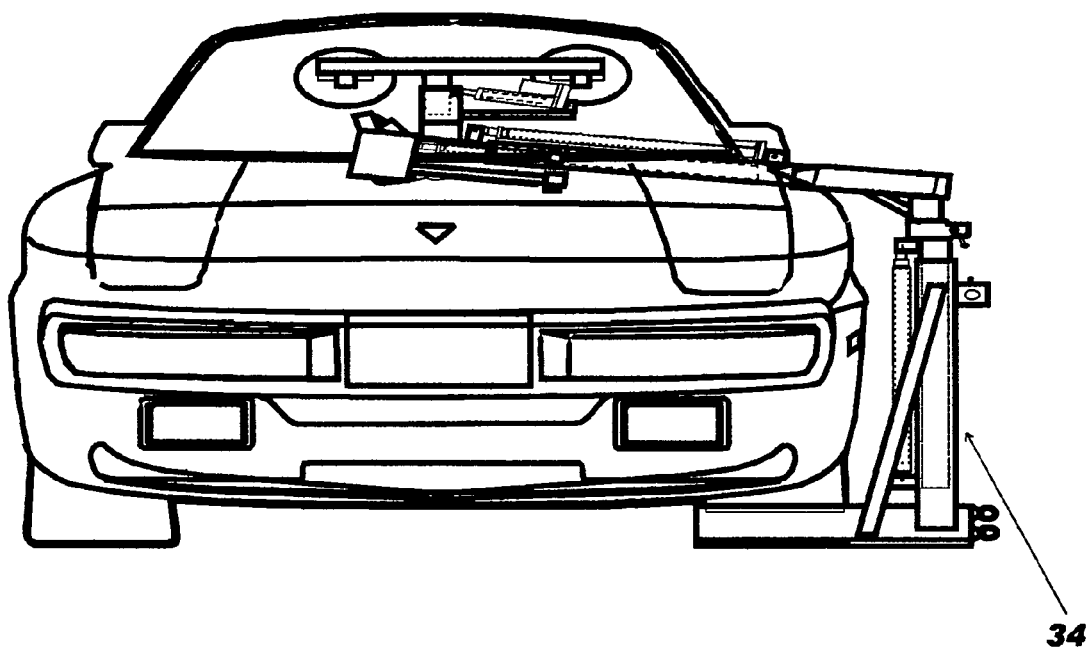
FIG. 1 Shows a front view of the windshield installation device coupled to a windshield.
Figure 2:
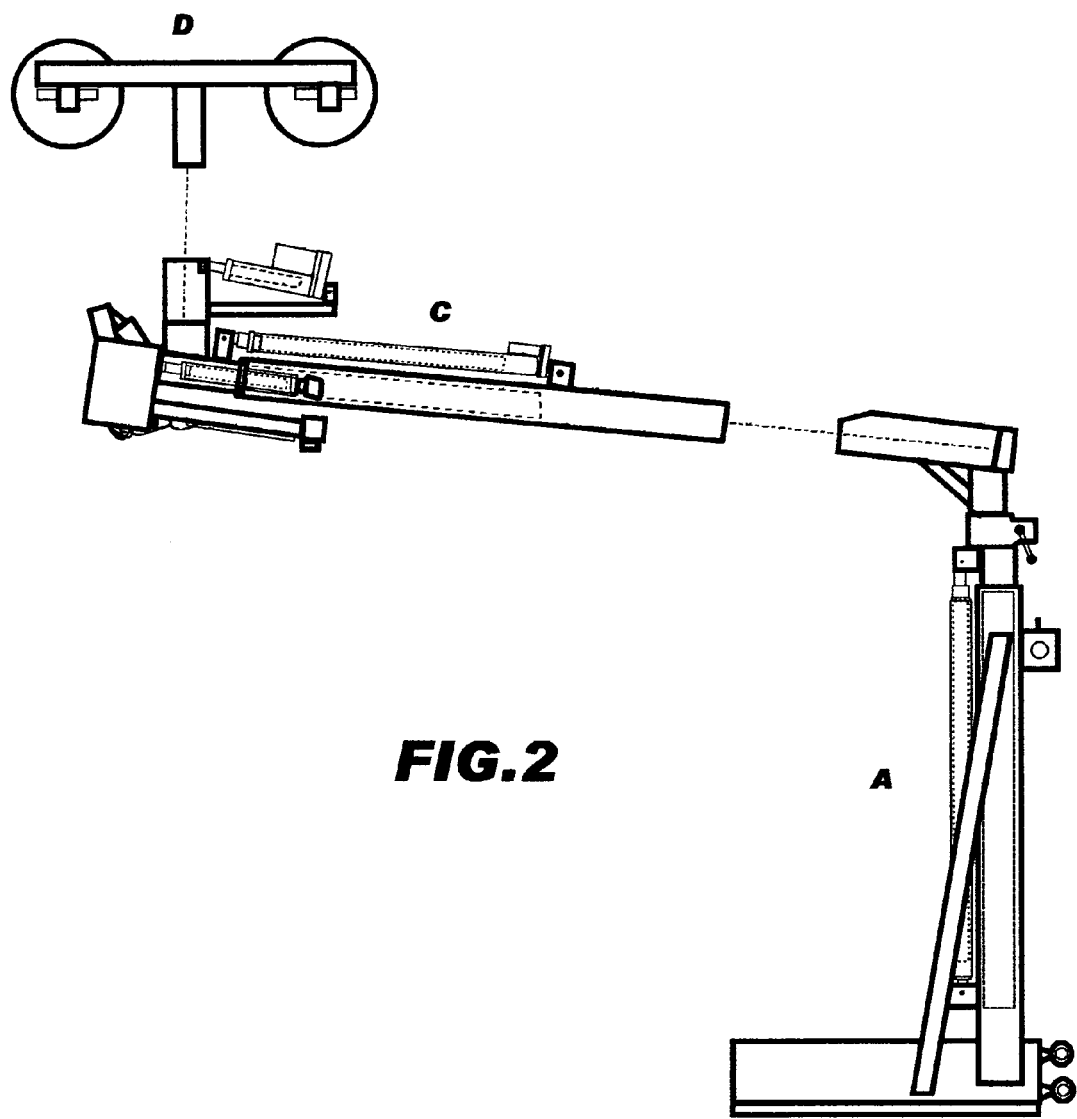
FIG. 2 Shows the breakdown of the parts A, C, & D required for a windshield installation on most automobiles and trucks.
Figure 3:
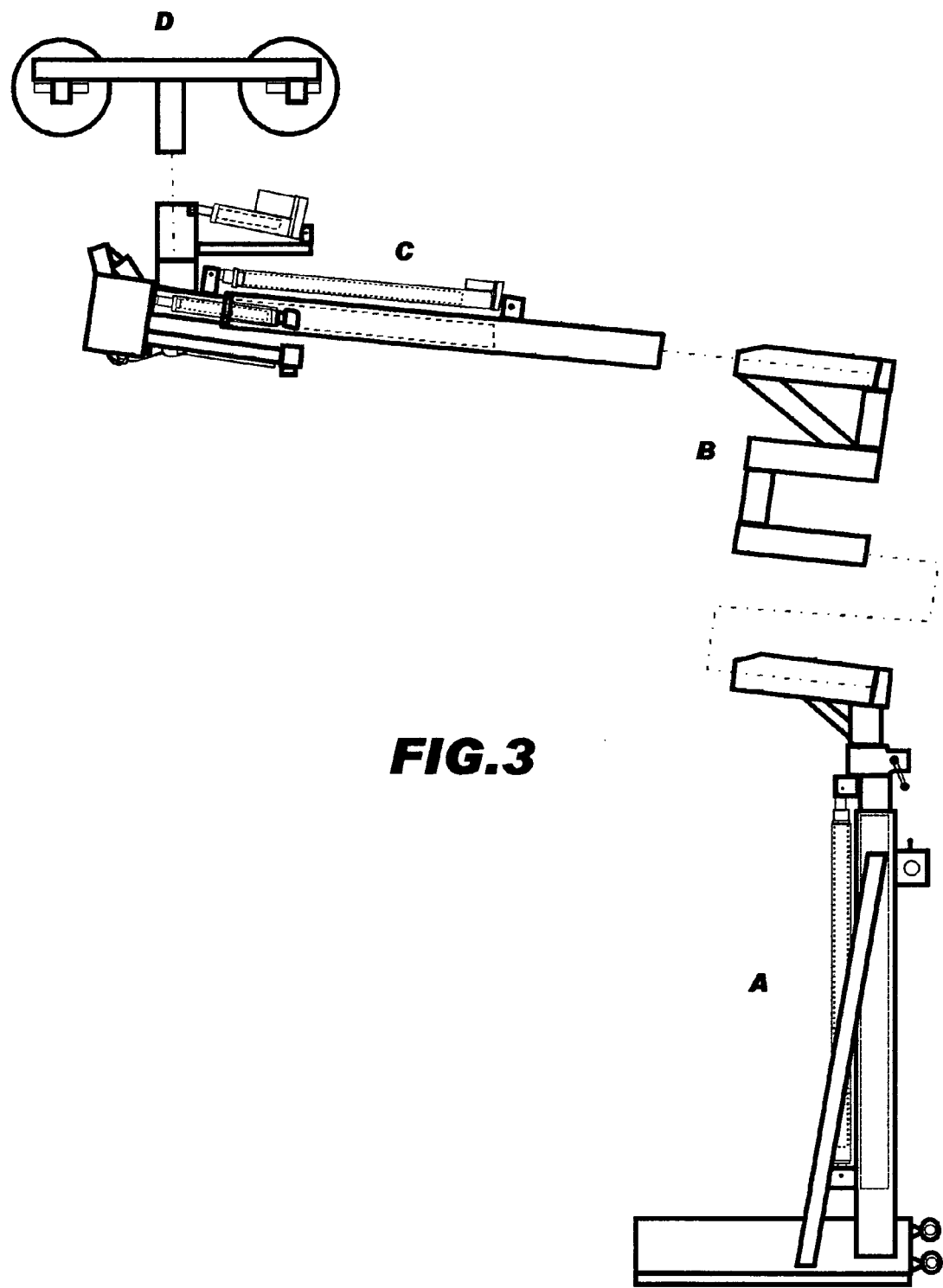
FIG. 3 Shows the breakdown of the parts A, B, C, & D required; with the addition of the extra height adapter B for windshield installation on large trucks.

Drive on plate 10 stabilizes device 34 with the weight of the vehicle being worked on while support brace 12 provides added support for device 34. Wheels 11 are provided so the installer of the glass can remove base section B from his vehicle and roll it to the vehicle being worked on.

Actuator 15, operated from switch 17, is used to adjust the height of horizontal arm 21 with telescoping post 13, 14, & 14A.

Receptor 17A receives the 12 volt plug from the installer's vehicle.

Figure 4:
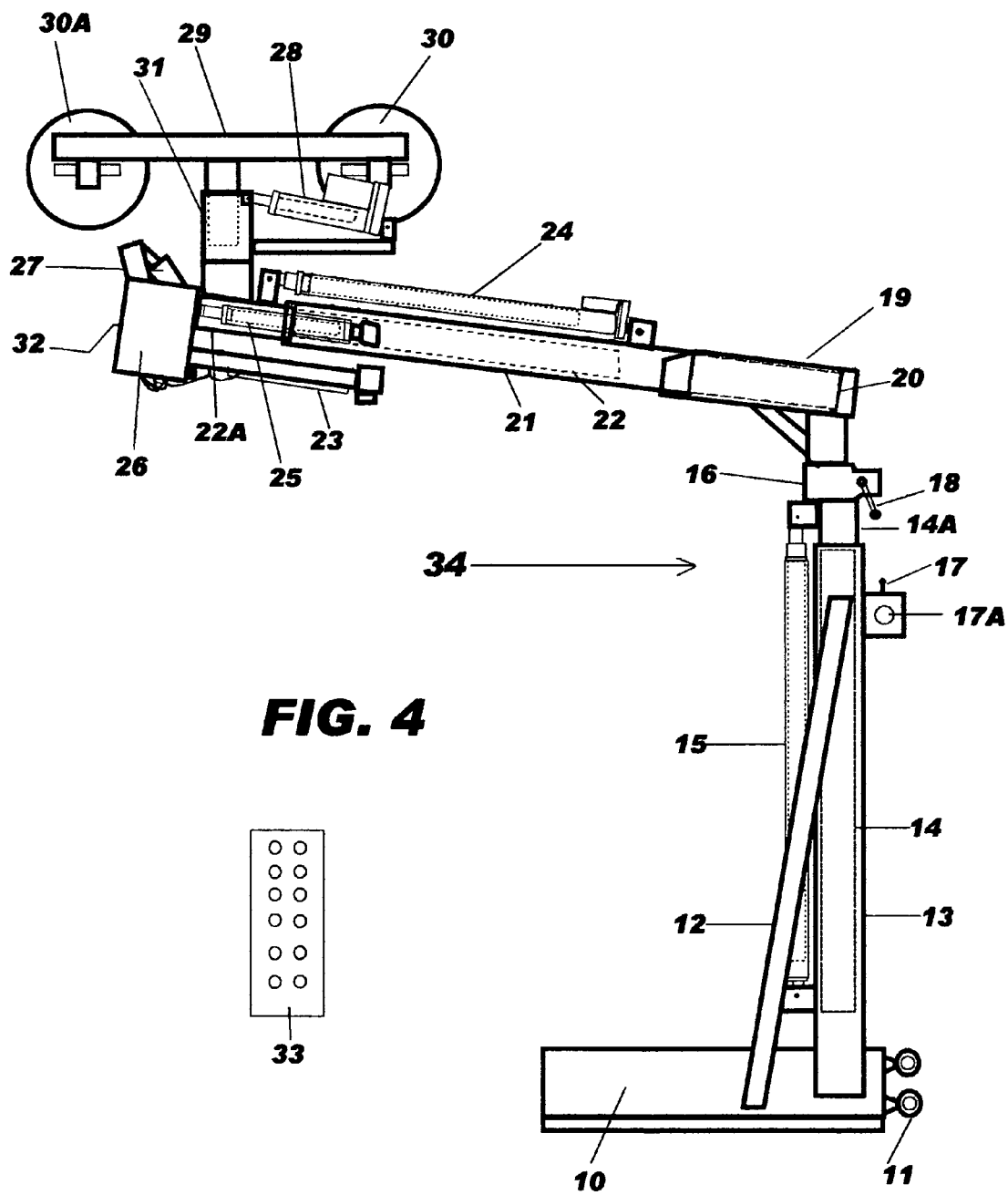
FIG. 4 Shows a view of the windshield installer device assembled without the height adapter B, including numbered parts and movements of the device.

Item 16 of FIG. 4 is the rotating point for horizontal arm 21, 22, & 22A and receiver 19. Twelve volt contact point 20 electrifies all actuators on horizontal swing arm 21, 22, & 22A.

Actuator 24 is operated by hand held remote control 33 to extend and retract telescoping arm 21, 22 & 22A. Handle 18 locks horizontal arm receiver 19 so horizontal swing arm 21, 22, & 22A can be held in the correct position to remove and/or reinstall the windshield or back glass.

Actuator 28 tilts suction cup arm 29 and receptor 31 from side to side. Actuator 27 pushes suction cup arm 29 up and down. Actuator 23 rotates at the end of horizontal arm 22A. Actuator 32, not shown, moves suction cup arm 29 in and out.

The seven remote control motions and the manual motion to rotate the swing arm are all required to handle the replacement glass on most automobiles and trucks.

What is claimed:

1. A portable remote controlled windshield installation device, for removing and installing a windshield on a vehicle with very little physical exertion by an installer, the device having lightweight sections, comprising:
    a vertical telescoping post having a base, and a drive-on plate attached to said base;
    wherein said vehicle is driven onto said drive-on plate so as to stabilize said vertical telescoping post;
    a horizontal telescoping arm including a plurality of dc volt actuators and suction cups;
    wherein said telescoping arm is mounted on said vertical post;
    a height extender for use with high vehicles;
    wherein said lightweight sections can be quickly assembled on site; and
    wherein said vertical telescoping post is adjustable vertically by a remote control dc actuator to allow the installer to position the windshield at a desired height.

2. The windshield installation device of claim 1, wherein said horizontal telescoping arm is adjustable by said remote control dc actuator to allow the installer to position the windshield horizontally.

3. The windshield installation device of claim 1, wherein said suction cups secure the glass to the horizontal telescoping arm so as to facilitate the positioning of the glass by the remote control dc actuator, and allows the installer to walk around and adjust the position of the glass by remote control during installation to assure proper placement of the glass into a sealant.

4. The windshield installation device of claim 1 wherein the device is portable, can be assembled at a job site within two minutes and allows one person to remove and install a windshield or back glass on most automobiles and trucks.

5. A remote controlled windshield installation device comprising of a vertical telescoping post having a base, wherein a drive-on plate is attached to said base;
    a horizontal telescoping arm which rotates on said vertical post with a cluster of dc volt actuators attached to the horizontal telescoping arm along with suction cups adapted to be secured to the glass, and the horizontal telescoping arm has a manual lock to lock the arm in any required position, and the cluster of dc volt actuators being self-locking in any stop position and provides all motions required to properly position the glass in the vehicle;
    a height extender for use with high vehicles; and
    wherein said installation device is stabilized by the weight of a vehicle by driving said vehicle on the drive-on plate.

6. The windshield installation device of claim 5 wherein the design facilitates the installation of the windshield a back glass in most automobiles and trucks.

7. The windshield installation device of claim, wherein the device is portable allows one person to install a windshield or back glass in a manner equivalent to factory installation by completing a final set without manual adjustments.

* * * * *